United States Patent [19]

LaBate

[11] 4,316,831

[45] Feb. 23, 1982

[54] MATERIAL FOR TREATING COKE OVEN DOORS AND JAMBS TO PREVENT THE BUILD UP OF TAR THEREON

[76] Inventor: Micheal D. LaBate, 110 N. Hazen Ave., Ellwood City, Pa. 16117

[21] Appl. No.: 181,123

[22] Filed: Aug. 25, 1980

Related U.S. Application Data

[63] Continuation-in-part of Ser. No. 49,349, Jun. 18, 1979, abandoned.

[51] Int. Cl.$^3$ .......................... C08L 31/00; B28B 7/36
[52] U.S. Cl. ...................... 260/29.6 S; 106/38.28; 106/84; 106/208; 106/209; 252/30; 260/29.6 H; 260/42.13
[58] Field of Search .................... 106/38.22, 38.28, 83, 106/84, 208, 209; 260/29.6 S, 29.6 H, 42.13; 252/29, 30

[56] References Cited

U.S. PATENT DOCUMENTS

| | | | |
|---|---|---|---|
| 2,807,552 | 9/1957 | Robinson et al. | 106/74 |
| 3,428,464 | 2/1969 | Pollard | 106/38.23 |
| 3,450,661 | 6/1969 | Neel et al. | 260/29.6 S |
| 4,035,265 | 7/1977 | Saunders | 106/84 |

*Primary Examiner*—Lorenzo B. Hayes
*Attorney, Agent, or Firm*—Webster B. Harpman

[57] ABSTRACT

A material containing submicron sized particles of graphite in a liquid carrier that contains a water soluable resin is described that forms a penetrating lubricating adhesive coating on the coke oven doors and jambs which acts to prevent leakage of tar and other coke by-products and the resultant build up as heretofore common in the art and the inability of maintaining a sealing relation between the doors and jambs.

5 Claims, No Drawings

MATERIAL FOR TREATING COKE OVEN DOORS AND JAMBS TO PREVENT THE BUILD UP OF TAR THEREON

This application is a continuation-in-part of my application Sec. No. 49,349 filed June 18, 1979 now abandoned.

BACKGROUND OF THE INVENTION (1) Field of the Invention

This invention relates to a material for treating coke ovens and the doors thereon to provide for the sealing of the doors with respect to the jambs during the coking operation.

(2) Description of the Prior Art

Coke ovens are provided at their opposite ends with self-sealing doors that depend on a metal to metal contact between the door and the continuous machined surface cast iron jamb.

In a typical example the sealing edge of the door is carried by a flexible frame and the door assembly includes a powerful spring between the door and the locking bar to force the sealing edge against the metal door jamb to prevent the escape of volatile products from the coke oven. Such door and jamb assemblies on the coke side and pusher side of the coke oven commonly fail to maintain a sealing metal to metal relation and tar and other by-products produced during the coking operation escape and build up between the door and jambs and must be manually removed each time the doors are removed and repositioned when the coke is pushed from the oven. The tar and by-products build up deposits which are difficult to remove and the removal is time consuming so that frequently the doors are repositioned and the desirable sealing relation to effect an efficient coking operation is adversely affected.

The present invention relates to a material for forming a penetrating and lubricating adhesive coating on the sealing edges of the doors and jambs that is not affected by the heat of the coking operation and to which tar and other by-products will not adhere with the result that the sealing edges of the doors and the jambs which are engaged thereby remain clean and free of tar and other by-product build up and can effectively seal the coke oven.

The prior art comprises my U.S. Pat. Nos. 4,187,334 and 4,187,335, issued Feb. 5, 1980.

SUMMARY OF THE INVENTION

A material for treating coke oven doors and jambs to prevent the build up of tar and other coke oven by-products thereon, contains essentially submicron sized particles of graphite in an improved liquid carrier wherein the extremely fine size of the submicron sized particles of graphite lowers the surface tension of the liquid carrier and enables the submicron sized graphite particles to penetrate the metal surfaces of the coke oven doors and jambs and also build up a smooth adhering surface coating. The liquid carrier comprises water, an aqueous sodium silicate solution, hydrochloric acid, and a water soluble resin, such as a carboxylated polymer, for example, carboxy polymethylene. The submicron sized graphite particles because of their critical size contribute to the penetrating, lubricating and adhesive coating ability of the material when applied to the coke oven doors and jambs as by spraying the same thereon.

DESCRIPTION OF THE PREFERRED EMBODIMENT

The material of this invention that is particularly suitable for supplying a penetrating and lubricating adhesive coating to coke oven doors and jambs comprises substantially between about 5% to 25% by weight submicron sized particles of graphite, between about 34% to 75% by weight of a solution of water and sodium silicate ($Na_2Si_3O_7$) wherein the sodium silicate is present at about 40% of the solution by weight, between about 2% and 10% concentrated hydrochloric acid of a 90% purity by weight, between about 33% to 75% of a solution of water and carboxy polymethylene polymer resin wherein the resin is present in amounts between 1% and 10% of the solution by weight.

The critical particle size of the submicron sized graphite particles being substantially amicron; less than 4 m$\mu$ or 10-7CM as determined by electron microscopy. The submicron sized graphite particles are made by ball milling the finest mesh colloidal graphite particles commercially available for a time sufficient to obtain the desired submicron graphite particle size which eliminates the platelets. The carboxy polymethylene polymer resin powder has a specific gravity of 1.41 and a bulk density of 13 lbs. per cubic foot. It is available as "CARBOPOL" from B. F. Goodrich Chemical Co. and low concentrations mixed with water as herein disclosed produce a thin gel-like liquid with penetrating and adhesive qualities.

The liquid carrier as set forth hereinbefore comprises an effective wetting agent which contributes to the ability of the submicron sized particles of graphite to form a penetrating lubricating and adhesive coating in and on the coke oven doors and jambs.

Those skilled in the art will also observe that the percentage of the submicron sized particles of graphite and the materials in the liquid carrier may be widely varied depending upon the number of applications of the material to the metal parts being treated. For example small percentages of the submicron sized particles of graphite in the liquid carrier perform effectively when a number of applications of the material are applied and when only one or a few applications of the material are applied to the metal surfaces, a higher percentage of the submicron sized particles of graphite are essential. In either case the material penetrates the metal surfaces being treated and builds up an extremely smooth, slick surface coating of excellent adherence to which the tar and by-products from the coke oven will not adhere or if some adherence occurs the adhering material may be easily removed by air or water or other fluid jets.

In using the material disclosed herein the process involves mixing the materials to form a liquid suspension of the submicron sized particles of graphite and the other materials and then spraying the same by any suitable spraying equipment on cleaned metal surfaces of the coke oven doors and jambs to be treated. One or more coatings are applied as necessary to build up the smooth unbroken surface of the material in and on the metal parts being treated and the material may be applied to the metal surfaces while they are either hot or cold.

The ability of the material to be applied to the hot metal surfaces is particularly advantageous in a coke oven operation as the doors are removed from the ovens to permit a pusher to move the coke from the ovens while the ovens themselves are maintained at or near coking temperatures.

Those skilled in the art will observe that the heretofore necessary manual cleaning of the doors and door jambs frequently required motorized buggies and similar mechanical equipment and the time of such cleaning is eliminated through the use of the material hereinbefore disclosed.

It will also be observed that the production of metallurgical coke is improved and stabilized by providing for the effective sealing of the coke oven doors made possible with the material herein disclosed.

It has been determined that other applications and uses of the material disclosed herein are possible and such may include the treating of forging dies in the hot forging of metals and the treatment of various metal handling and processing equipment wherein the surface condition of the metal treating equipment is desirably maintained in a smooth condition resisting adhesion or contaminates thereto.

Additionally ingot molds are advantageously treated with the material of the invention as such treatment expedites the stripping of ingots from the molds. The following specific examples of the material have been found satisfactory for the treatment of coke oven doors and jambs and like metal surfaces.

A. Substantially 8% by weight submicron sized particles of high purity synthetic graphite, substantially 7% by weight concentrated hydrochloric acid of substantially 90% purity, substantially 18% by weight water ($H_2O$), substantially 34% by weight aqueous sodium silicate solution wherein the $Na_2Si_3O_7$ is present at about 40% by weight of the solution and substantially 33% by weight of a solution of water and a water soluable carboxy polymethylene polymer resin as a powder wherein the resin is present at substantially 8% by weight of the solution.

B. Substantially 8% by weight submicron sized particles of high purity synthetic graphite, substantially 7% by weight concentrated hydrochloric acid of substantially 90% purity, substantially 18% by weight water ($H_2O$), substantially 67% by weight aqueous sodium silicate solution wherein the $Na_2Si_3O_7$ is present at about 40% by weight of the solution.

C. Substantially 8% by weight submicron sized particles of high purity synthetic graphite, substantially 7% by weight concentrated hydrochloric acid of substantially 90% purity, substantially 18% by weight water ($H_2O$), substantially 67% by weight aqueous solution of carboxy polymethylene polymer resin as a powder wherein the resin is present at substantially 8% by weight of the aqueous solution.

An alternate liquid carrier has been found to produce a suitable suspension of the submicron sized particles of graphite and substitutes xanthan gum for the resin, the gum is a natural high molecular weight linear polysaccharide, functioning as a hydrophilic colloid to maintain the submicron sized particles of graphite in suspension and contributes to the penetrating lubricating adhesive coating as described hereinbefore.

A specific example of such an alternate material follows:

D. Substantially 8% by weight submicron sized particles of high purity synthetic graphite, substantially 7% by weight concentrated hydrochloric acid of substantially 90% purity, substantially 18% by weight water ($H_2O$), substantially 67% by weight aqueous solution of xanthan gum as a powder wherein the gum is present at substantially 8% by weight of the aqueous solution.

Variations in the amounts of xanthan gum may be used as from 1% to 19% of the aqueous solution.

The treatment of coke oven doors and jambs hereinbefore referred to with the material disclosed herein obtains excellent results by reason of the very fine submicron sized graphite particles of the material in the liquid carrier.

The material of the invention can be used in the treatment of ingot molds and obtains unusual results in freeing an ingot from the mold for the reason that molten steel in an ingot mold takes carbon from the metal of the ingot mold thereby adversely affecting the interior of the mold by removing portions thereof. It is also known that when this occurs, the stripping of the cooled ingot from the mold becomes more difficult because of the interlock obtained between the solidifying ingot metal and the irregular surface of the mold. By heating an ingot mold the grain structure enlarges and the porosity of the metal increases and the material is preferably applied to the mold when it is heated as by spraying.

Under such conditions the submicron sized particles of graphite aided by the materials in the liquid carrier penetrates the metal surfaces of the ingot mold which have been previously cleaned and build up a smooth lubricating and adhereing coating which becomes largely graphite and is able to supply the carbon that molten steel absorbs, usually from the ingot mold.

Thus the treating material is sacrificed to some degree and the inner surface of the ingot mold retained in its desirable smooth condition. Stripping ingots from such a smooth inner surface of the mold is thus considerably expeditied and the molds last considerably longer as the carbon from the metal of the molds is not sacrificed as has heretofore been common in the art. The material of the present invention therefore has been advantageously used in treating ingot molds as well as its primary function of treating coke oven doors and jambs.

Although the embodiments of the present invention have been limited as described hereinbefore, it will be apparent to those skilled in the art that various changes and modifications may be made therein without departing from the spirit of the invention and having thus described my invention what I claim is:

1. A normally liquid suspension material for forming penetrating and lubricating adhesive coatings on coke oven doors and jambs and comprising between about 5% to 25% by weight submicron sized particles of graphite having a particle size less than about 4 m$\mu$ as determined by electron microscopy, said submicron sized particles being small enough to penetrate into the grain structure of coke oven doors and jambs, between about 34% to 75% of a solution of water and sodium silicate ($Na_2Si_3O_7$), wherein the sodium silicate is present at about 40% of the solution, between about 2% to 10% concentrated hydrochloric acid of a 90% purity by weight, between about 33% to 75% of a solution water and a water soluble resin of containing carboxyl groups wherein the resin is present in amounts between 1% and 10% of the solution by weight and between about 15% to 20% water by weight.

2. The liquid suspension material of claim 1 and wherein the graphite is synthetic graphite.

3. A normally liquid suspension material for forming a penetrating and adhering lubricating coating for the engaging portions of metal coke oven doors and jambs adapted to be subjected to a high temperature as in the making of coke and including at least 5% to 25% by weight submicron sized particles of carbon, having a particle size less than about 4 m$\mu$ as determined by electron microscopy, said submicron sized particles being small enough to penetrate into the grain structure of coke oven doors and jambs, between about 50% to 75% of a solution of water and sodium silicate and wherein the sodium silicate is present in about 40% of the solution by weight, between about 2% to 10% concentrated hydrochloric acid by weight and between about 15% and 20% water.

4. A normally liquid suspension material for forming and penetrating an adhering lubricating coating to the engaging portions of metal coke oven doors and jambs adapted to be subjected to a high temperature as in the making of coke and including at least about 15% by weight submicron sized particles of graphite, having a particle size less than about 4 mµ as determined by electron microscopy, said submicron sized particles being small enough to penetrate into the grain structure of coke oven doors and jambs, about 50% of a solution of water and carboxy polymethylene resin wherein the resin is present in an amount about 8% of the solution, about 5% concentrated hydrochloric acid of a 90% purity and the balance water.

5. A normally liquid suspension material for forming and penetrating an adhering lubricating coating to the engaging portions of metal coke oven doors and jambs adapted to be subjected to a high temperature as in the making of coke and including at least about 15% by weight submicron sized particles of graphite, having a particle size less than about 4 mµ as determined by electron microscopy, said submicron sized particles being small enough to penetrate into the grain structure of coke oven doors and jambs, about 67% by weight of a solution of water and xanthan gum as a powder wherein the xanthan gum powder is present in an amount about 8% of the solution, about 7% concentrated hydrochloric acid of a 90% purity and about 11% water.

* * * * *